United States Patent
Lee

(10) Patent No.: US 10,988,106 B2
(45) Date of Patent: Apr. 27, 2021

(54) SEAT BELT SAFETY APPARATUS FOR VEHICLE

(71) Applicants: Hyundai Motor Company, Seoul (KR); Kia Motors Corporation, Seoul (KR)

(72) Inventor: Hyun Woo Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 120 days.

(21) Appl. No.: 16/242,347

(22) Filed: Jan. 8, 2019

(65) Prior Publication Data

US 2020/0114864 A1    Apr. 16, 2020

(30) Foreign Application Priority Data

Oct. 12, 2018   (KR) .................. 10-2018-0121981

(51) Int. Cl.
*B60R 22/38* (2006.01)
*B60R 22/26* (2006.01)
*B60R 22/46* (2006.01)
*B60R 22/34* (2006.01)
*B60R 22/18* (2006.01)

(52) U.S. Cl.
CPC .............. *B60R 22/38* (2013.01); *B60R 22/26* (2013.01); *B60R 22/4604* (2013.01); *B60R 22/4633* (2013.01); *B60R 2022/1818* (2013.01); *B60R 2022/3427* (2013.01)

(58) Field of Classification Search
CPC . B60R 22/34; B60R 2022/1818; B60R 22/38; B60R 2022/3427; B60R 22/4633; B60R 22/4604; B60R 22/1955; B60R 22/26

USPC .......................................................... 297/480
See application file for complete search history.

(56) References Cited

U.S. PATENT DOCUMENTS

| | | | | |
|---|---|---|---|---|
| 3,549,203 A * | 12/1970 | Rawson | ................... | B60R 22/34 297/476 |
| 5,326,043 A * | 7/1994 | Yamanoi | ................. | B60R 22/42 242/374 |
| 5,346,152 A * | 9/1994 | Fohl | ..................... | B60R 22/1951 242/371 |
| 5,845,939 A * | 12/1998 | Greiner | ............... | B60R 22/1951 280/806 |
| 6,139,058 A * | 10/2000 | Bohmler | ............. | B60R 22/1951 280/806 |
| 6,264,280 B1 * | 7/2001 | Ohlund | ............... | B60R 22/1951 297/216.13 |
| 7,350,734 B2 * | 4/2008 | Stevens | ............... | B60R 22/1955 242/374 |
| 7,540,537 B2 * | 6/2009 | Bell | ..................... | B60R 22/1951 280/806 |

(Continued)

FOREIGN PATENT DOCUMENTS

KR    10-1491409 B1    2/2015

*Primary Examiner* — Milton Nelson, Jr.
(74) *Attorney, Agent, or Firm* — Mintz Levin Cohn Ferris Glovsky and Popeo, P.C.; Peter F. Corless

(57) ABSTRACT

A seat belt safety apparatus for a vehicle is provided and implements both of the functions of a retractor and a pretensioner in a structure with a seat belt disposed in a seat. The functions of a retractor and a pretensioner are separated in the seat belt safety apparatus to reduce the installation space.

11 Claims, 4 Drawing Sheets

(56) References Cited

U.S. PATENT DOCUMENTS 8,328,275 B2 * 12/2012 Vogt .................... B60N 2/2812
297/216.11

* cited by examiner

SEAT BELT SAFETY APPARATUS FOR VEHICLE

CROSS REFERENCE TO RELATED APPLICATION

The present application claims priority of Korean Patent Application No. 10-2018-0121981 filed on Oct. 12, 2018, the entire contents of which are incorporated herein for all purposes by this reference.

BACKGROUND

1. Field of the Disclosure

The present disclosure relates to a seat belt safety apparatus for a vehicle, and more particularly, to a seat belt safety apparatus that implements both functions of a retractor and a pretensioner.

2. Description of the Prior Art

In general, automotive seat belts are configured to prevent secondary collisions, attenuate shock, and prevent passengers from flying out of a vehicle by holding the bodies of passengers during a vehicle collision. A three-point safety belt composed of shoulder belts for holding the shoulders and a wrap belt for holding the waist is a common type of seat belt. High safety in a vehicle collision has been proven, and thus, seat belts are recognized as absolutely necessary devices for safety of passengers. Recently, locks that allow seat belts to be adjusted at optimum holding heights in accordance with body shapes or that reduce an injury to passengers without restricting movement in a collision have been developed.

These seat belts have come to be equipped with a retractor pretensioner to fix a passenger in close contact with a seat by rewinding a seat belt during a vehicle collision. Such a retractor pretensioner minimizes the movement distance of a passenger due to inertia by fixing the passenger in close contact with a seat by rapidly rewinding the seat belt during a vehicle collision. Accordingly, it is possible to minimize the possibility of injuries to passengers that may occur in a vehicle.

However, the retractor pretensioners of the related art have both of the function of a retractor and the function of a pretensioner, and thus are large in size and difficult to mount in a seat. In particular, the positions of seats of self-driving vehicles are freely adjusted, so retractors and pretensioners should be installed in the seats. However, the sizes of retractor pretensioners are large, so these retractor pretensioners are difficult to apply.

The description provided above as a related art of the present disclosure is merely for helping understanding the background of the present disclosure and should not be construed as being included in the related art known by those skilled in the art.

SUMMARY

The present disclosure provides a seat belt safety apparatus for a vehicle, the seat belt safety apparatus implementing both of the functions of a retractor and a pretensioner in a structure with a seat belt disposed in a seat and being able to be more easily mounted in a seat due to reduction of an installation space since a retractor and a pretensioner are separately configured.

In accordance with an aspect of the present disclosure, a seat belt safety apparatus for a vehicle may include: a webbing that is wound into or drawn out of a retractor and holds a passenger in a seat; and a pretensioner that is spaced apart from the retractor, is composed of a plurality of guides around which the webbing winds and an actuator providing actuating force to the guides, the guides being able to move away from each other in a winding direction of the webbing to apply a holding force to the passenger by pulling the webbing when the actuator is operated and the guides are moved away from each other.

The retractor and the pretensioner may be installed on a seat frame, the retractor may be disposed under the pretensioner, and the webbing extends upward diagonally with respect to the seat frame and may be wound around the guides without overlapping. The guides may include: a fixed guide fixed to a vehicle body or a seat frame with the actuator mounted thereon; and a movable guide movably coupled to the fixed guide to be able to move away from the fixed guide by being drawn out of the fixed guide when the actuator is operated.

The fixed guide and the movable guide may be formed in bar shapes and arranged symmetrically, and the fixed guide may include cylinder portions that extend in a direction moving away from the movable guide and each having a aperture being open in the extension direction and the movable guide may include piston portions that extend to be inserted in the aperture of the cylinder portions. The actuator is a gas supplier mounted on the fixed guide and configured to supply gas to the cylinder portions, and when gas is supplied, the piston portions may be released from the cylinder portions, and thus, the movable guide may be moved away from the fixed guide.

The fixed guide may include a central aperture therein and may include the cylinder portions that communicate with the central aperture at both ends, and the piston portions inserted in the cylinder portions may be formed at both ends of the movable guide. A locking step may be formed in each of the apertures of the cylinder portions and a locking portion may be formed at each of the piston portion to be locked to a corresponding one of the locking steps while sliding in a corresponding one of the apertures. The locking portion may include a first fixing portion and a second fixing portion spaced apart from each other in an insertion direction of the piston portion in the aperture, balls may be disposed between the first fixing portion and the second fixing portion, and the first fixing portion may be tapered toward the second fixing portion.

The cylinder portion may include: an outer body that extends from the fixed guide, having an insertion aperture, and having a plurality of locking protrusions circumferentially formed and longitudinally arranged in the insertion hole; and an inner body inserted in the insertion aperture of the outer body, having the aperture, in which the locking portion of the piston portion may be inserted, and having locking grooves formed on the outer side to correspond to the locking protrusions.

Fixing protrusions may be formed on the outer side of the fixed guide and spaced apart from each other in the longitudinal direction of the fixed guide, supporting protrusions may be formed on the outer side of the movable guide and spaced apart from each other in the longitudinal direction of the movable guide, and the fixing protrusions and the supporting protrusions may each be spaced apart from each other in the longitudinal direction by the width of the webbing.

The fixing protrusions of the fixed guide and the supporting protrusion of the movable guide may be spaced apart from each other in a zigzag pattern such that the webbing is wound diagonally to the facing direction of the fixing protrusions and the supporting protrusions. The movable guide may be made of a material having lower rigidity, but greater toughness than the fixed guide to be bent by a pulling force of the webbing when the movable guide is drawn out of the fixed guide.

According to the seat belt safety apparatus for a vehicle having the structure described above, a device that provides the functions of a retractor and a pretensioner in a structure in which a seat belt is disposed in a seat is mounted. Further, since the functions of a retractor and a pretensioner are separated, the installation space may be reduced and since the functions are performed more smoothly, stability of a passenger may be secured.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A seat belt safety apparatus for a vehicle according to an exemplary embodiment of the present disclosure is described hereafter with reference to the accompanying drawings.

Figure 1:
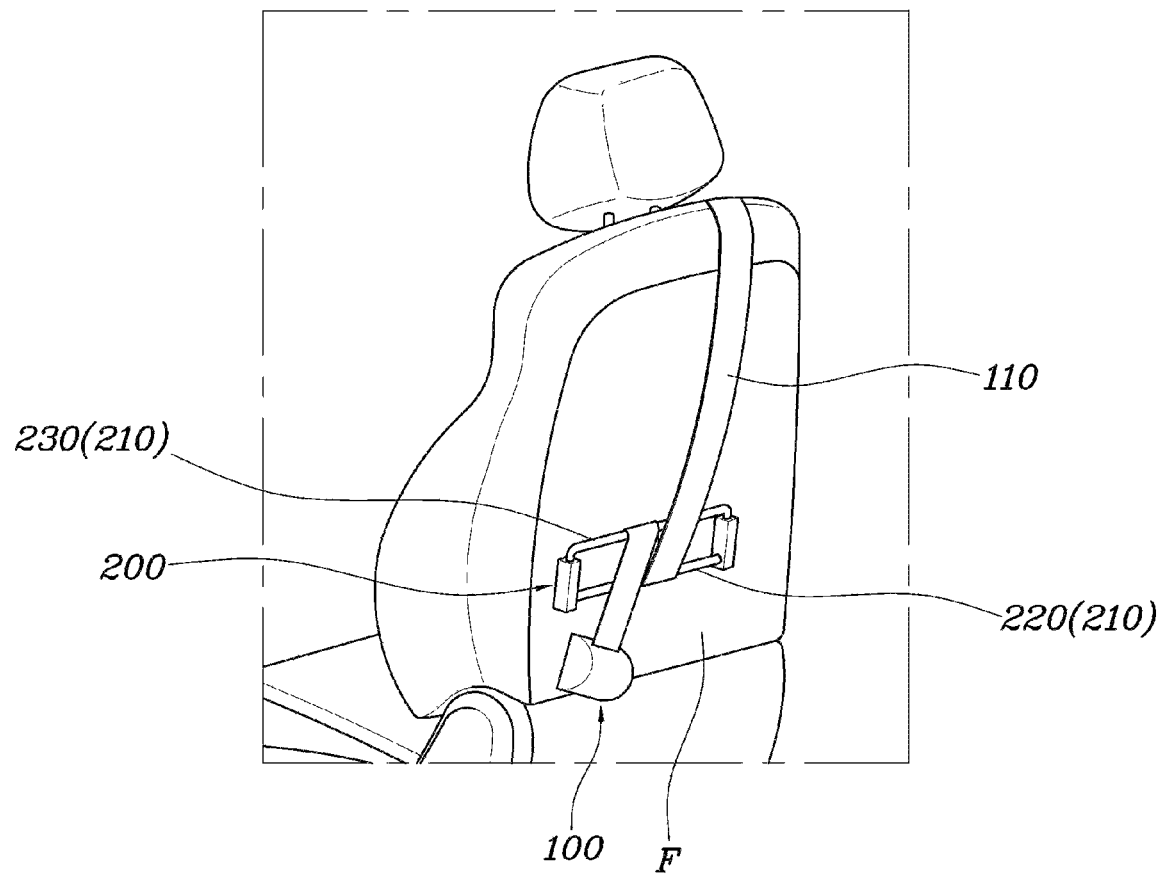
FIG. 1 is a view showing a seat belt safety apparatus for a vehicle according to an exemplary embodiment of the present disclosure.
Figure 2:
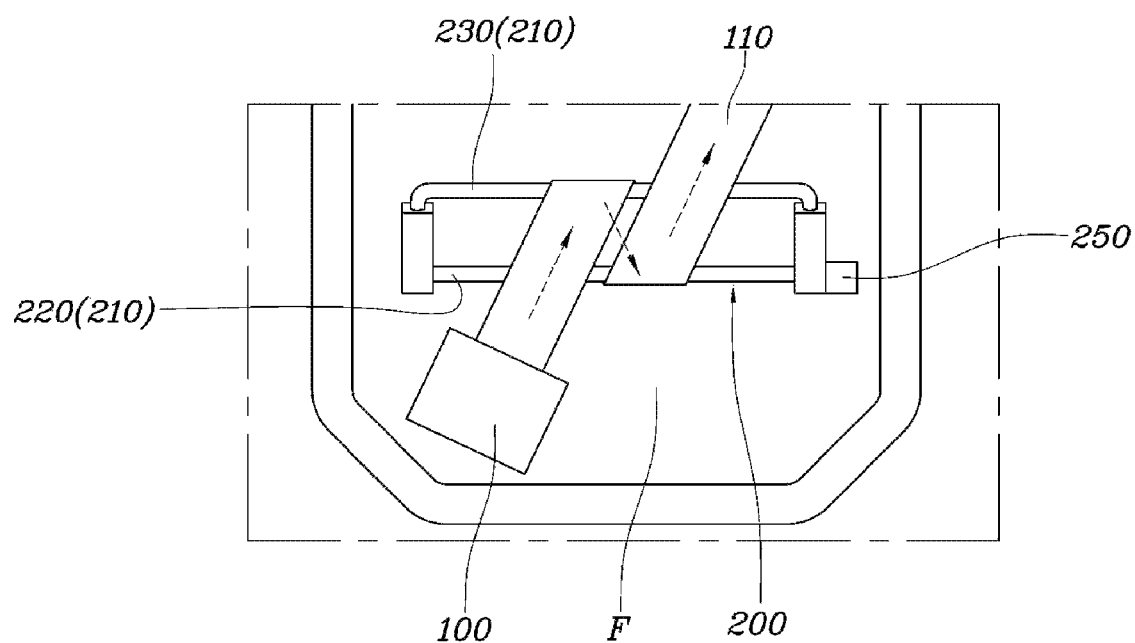
FIGS. 2, 3, 4 and 5 are views illustrating the seat belt safety apparatus for a vehicle shown in FIG. 1 according to an exemplary embodiment of the present disclosure.
Figure 5:
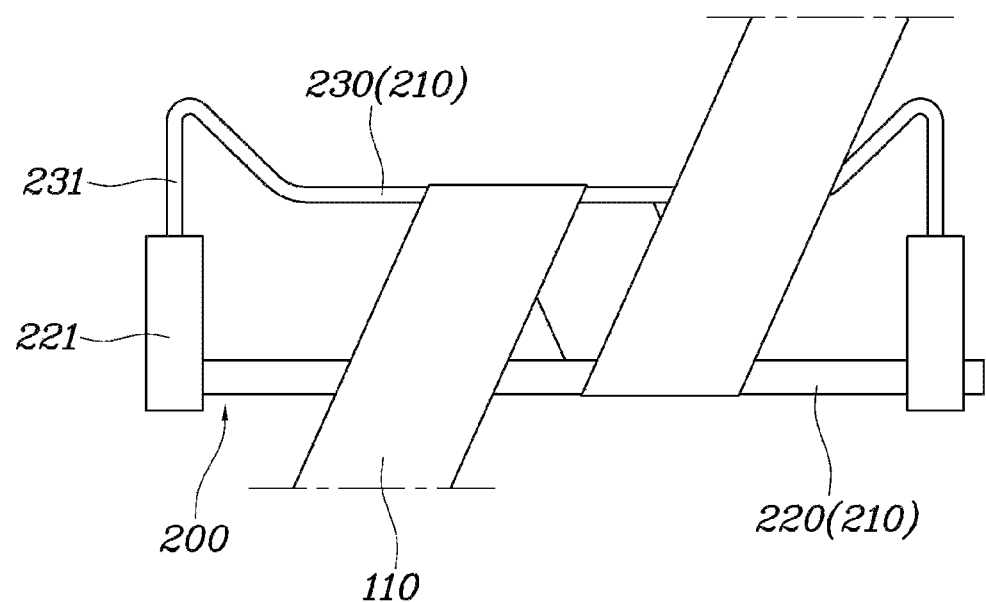

FIG. 1 is a view showing a seat belt safety apparatus for a vehicle according to an exemplary embodiment of the present disclosure and FIGS. 2 and 5 are views illustrating the seat belt safety apparatus for a vehicle shown in FIG. 1.

A seat belt safety apparatus for a vehicle according to an exemplary embodiment of the present disclosure, as shown in FIGS. 1 and 2, may include: a webbing 110 that is wound into or drawn out of a retractor 100 and holds a passenger in a seat; and a pretensioner 200 that is spaced apart from the retractor 100, may include a plurality of guides 210 on which the webbing 110 winds and an actuator 250 configured to provide actuating force to the guides 210, the guides 210 being able to move away from each other in a winding direction of the webbing 110 to apply a holding force to the passenger by pulling the webbing 110 when the actuator 250 is operated and the guides 210 are moved away from each other.

As described above, according to the present disclosure, the retractor 100 and the pretensioner 200 may be separated and the webbing being withdrawn from the retractor 100 extends to a passenger after being wound around the guides 210 of the pretensioner 200. In particular, the pretensioner 200 may be configured such that the guides 210 may be moved away from each other in the winding direction of the webbing 110, and the guides 210 may be moved away from each other by the actuator 250. Accordingly, when the actuator 250 is operated, the guides 210 may be moved away from each other and the webbing 110 may be pulled, thereby securing a holding force for a passenger.

The retractor 100 and the pretensioner 200 ay be installed on a seat frame F, the retractor 100 may be disposed under the pretensioner 200, and the webbing 100 is withdrawn upward out of the retractor 100 diagonally with respect to the seat frame F, to be wound around the guides 210 without overlapping. The retractor 100 and the pretensioner 200 according to the present disclosure may be installed on a vehicle body, but may be installed on a seat in vehicles in which the positions of seats are changed such as a self-driving or autonomous vehicle.

As described above, when the retractor 100 and the pretensioner 200 are installed on the seat frame F, the retractor 100 may be disposed under the pretensioner 200. Accordingly, the webbing 110 being withdrawn out of the retractor 100 toward the top of the seat frame F may wind around the guides 210 of the pretensioner 200 and then continues to extend toward the top of the seat frame F, and thus, the webbing 110 may extend to a position where it is capable of holding a passenger. In particular, since the webbing 110 coming out of the retractor 100 extends upward diagonally with respect to the seat frame F after being wound around the guides 210 without overlapping, even when the webbing 110 is moved up and down, twisting due to overlapping of the webbing 110 may be prevented.

According to the present disclosure, when a vehicle collision is sensed by a collision sensor or an infrared sensor within the vehicle, the webbing 110 may be drawn back by the retractor 100, and thus, the passenger in the seat is held (e.g., held in place or held against the seat) by the webbing 110. Further, since the guides 210 of the pretensioner 200 are moved away from each other by the actuator 250, a pulling force may be applied to the webbing 110 winding around the guides 210 and the passenger held by the webbing 110 is brought in close contact with the seat, and thus, the passenger is held more strongly against the seat.

Since a passenger is held in a seat during a vehicle collision, as described above, injury to the passenger may be minimized. Further, since the retractor 100 and the pretensioner 200 are separated from each other, the installation space may be reduced. In particular, according to an exemplary embodiment of the present disclosure, the guides 210, as shown in FIGS. 1 and 2, may include: a fixed guide 220 fixed to a vehicle body or the seat frame F with the actuator 250 mounted thereon; and a movable guide 230 movably coupled to the fixed guide 220 to be able to move away from the fixed guide 220 by being drawn out of the fixed guide 220 when the actuator 250 is operated.

As described above, the guides 210 may include the fixed guide 220 and the movable guide 230, and thus, when the actuator 250 is operated, the movable guide 230 may be drawn out of the fixed guide 220, whereby the movable guide 230 moves away from the fixed guide 220. Accordingly, the distance between the portions where the webbing 110 winds around the movable guide 230 and the fixed guide 220 increases and a pulling force may be applied to the webbing 110, and thus, the force that holds the passenger in the seat may be increased.

The fixed guide 220 and the movable guide 230 may be formed in bar shapes and arranged symmetrically. Additionally, the fixed guide 220 may have cylinder portions 221 that extend in a direction moving away from the movable guide 230 and each having a aperture 221*a* being open in the extension direction and the movable guide 230 may have piston portions 231 that extend to be inserted in the apertures 221*a* of the cylinder portions 221.

Figure 3:
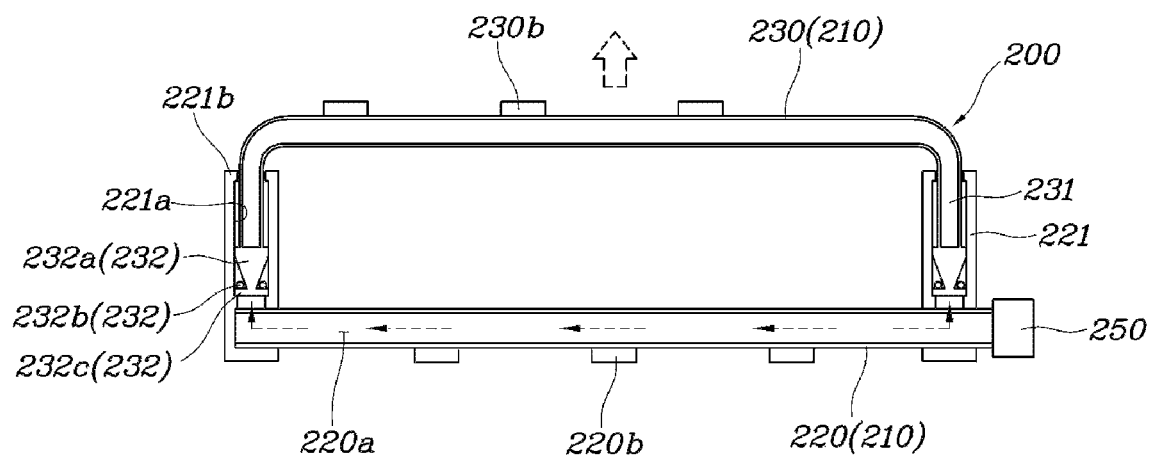

As shown in FIGS. 2 and 3, since the bar-shaped fixed guide 220 and movable guide 230 may be arranged symmetrically, the webbing 110 may be wound around the fixed guide 220 and the movable guide 230 without overlapping in the longitudinal direction of the fixed guide 220 and the movable guide 230. Further, since the fixed guide 220 and the movable guide 230 may be formed in straight bar shapes, the webbing 110 wound around the fixed guide 220 and the movable guide 230 may be drawn out more smoothly while turning around the guides.

Since the fixed guide 220 has the cylinder portions 221 having the apertures 221*a* and the piston portions 231 of the movable guide 230 may be inserted in the apertures 221*a* of the cylinder portions 221, the movable guide 230 may be coupled to the fixed guide 220 to be able to be drawn out of the fixed guide 220. In other words, since the actuator 250 may be mounted on the fixed guide 220, when the actuator 250 is operated, a driving force may be transmitted to the cylinder portions 221 and the piston portions 231 inserted in the apertures 221*a* of the cylinder portion 221 may be drawn out of the cylinder portion 221 by the driving force, whereby the movable guide 230 may be moved away from the fixed guide 220 together with the piston portions 231.

In particular, as shown in FIG. 3, a central aperture 220*a* may be formed through the fixed guide 220, the cylinder portions 221 communicating with the central aperture 220*a* may be formed at both ends of the fixed guide 220, and the piston portions 231 inserted in the cylinder portions 221 may be formed at both ends of the movable guide 230. The actuator 250 may be a gas supplier mounted on the fixed guide 220 and configured to operate to supply gas to the cylinder portions 221. Accordingly, when gas is supplied, the piston portions 231 may be released from the cylinder portions 221, and thus, the movable guide 230 may move away from the fixed guide 220.

In other words, the actuator 250 may be an inflator that is a gas supplier configured to supply gas to thus provide a driving force that moves the movable guide 230 away from the fixed guide 220. Since the central aperture 220*a* may be formed in the fixed guide 220 and the cylinder portions 221 having the apertures 221*a* communicating with the central aperture 220*a* may be formed at both ends of the fixed guide 220, the gas supplied from the actuator 250 may flow into the central aperture 220*a* and the aperture 221*a*. Further, since the piston portions 231 inserted in the cylinder portions 221 may be formed at the movable guide 230, the piston portions 231 may be released by the gas flowing in the apertures 221*a* of the cylinder portion 221.

In other words, when the actuator 250 is operated with the piston portions 231 inserted in the apertures 221*a* of the cylinder portions 221, the gas supplied from the actuator 250 may flow into the central aperture 220*a* and the apertures 221*a* of the fixed guide 220, thereby releasing the piston portions 231 inserted in the cylinder portions 221. Accordingly, the movable guide 230 may be released from the fixed guide 220, and thus, the movable guide 230 may be moved away from the fixed guide 220.

Further, since the cylinder portions 221 may be formed at both ends of the fixed guide 220 and the piston portions 231 may be formed at both ends of the movable guide 230, the movable guide 230 may be more stably coupled to the fixed guide 220. The gas from the actuator 250 may be supplied to the plurality of cylinders 221 and may release the plurality of pistons 231, whereby the response speed is improved. On the other hand, as shown in FIGS. 3 and 4, a locking step 221*b* may be formed on the inner side of the aperture 221*a* of the cylinder portion 221 and a locking portion 232*a* may be formed at the piston portion 231 to be locked to the locking step 221*b* while sliding in the aperture 221*a*.

Accordingly, when the piston portion 231 is drawn out of the cylinder portion 221, the piston portion 231 may be moved in the aperture 221*a* of the cylinder portion 221 and the locking portion of the piston portion 231 may be locked to the locking step 221*b* of the cylinder portion 221, whereby the piston portion 231 is not fully separated out of the cylinder portion 221. In other words, if the piston portion 231 is fully separated out of the cylinder portion 221 and an excessive pulling force is applied to the webbing 110, a passenger may be excessively tightened or held against the seat, and thus, the movement amount of the piston portion 231 in the cylinder portion 221 may be limited. Therefore, the distance between the movable guide 230 and the fixed guide 220 may be maintained within a predetermined range, to more safely hold a passenger in the seat by an appropriate holding force.

Figure 4:
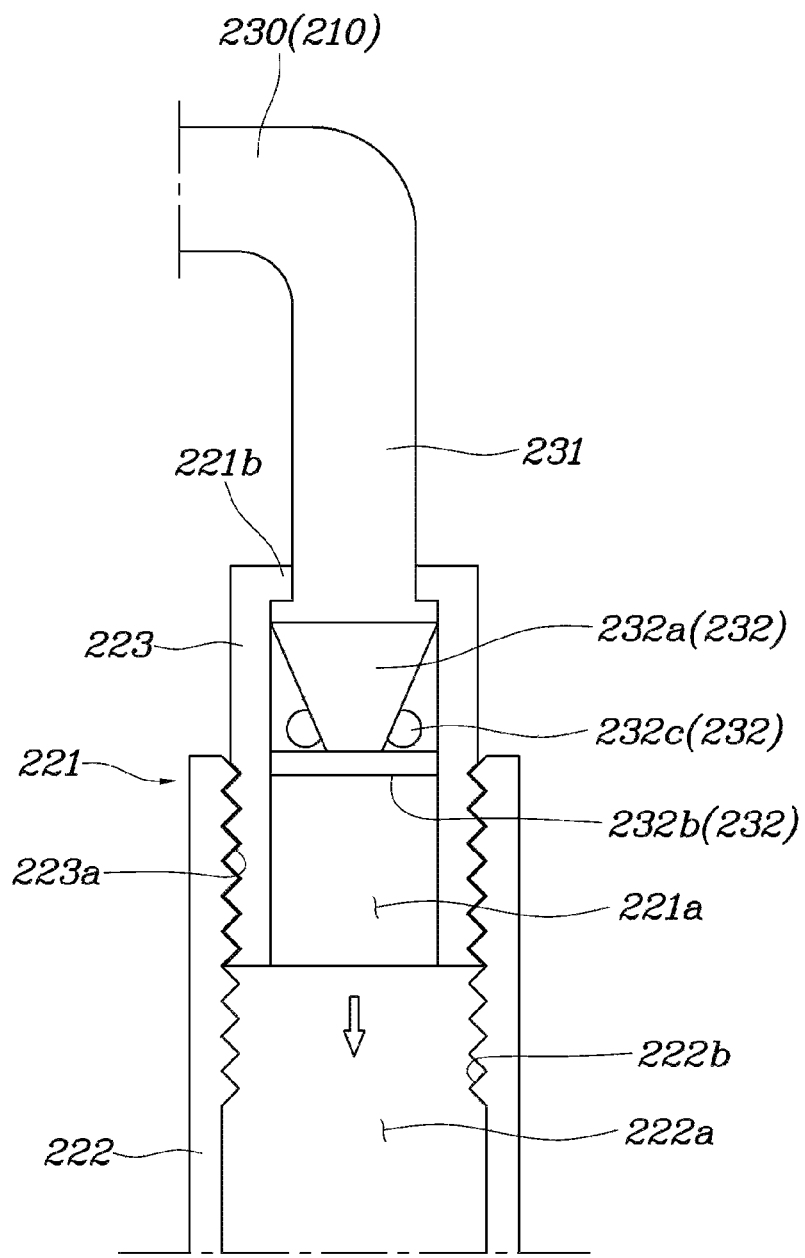

Meanwhile, as shown in FIG. 4, the locking portion 232 may include a first fixing portion 232*a* and a second fixing portion 232*b* spaced apart from each other in the insertion direction of the piston portion 231 in the aperture 221*a*, balls 232*c* may be disposed between the first fixing portion 232*a* and the second fixing portion 232*b*, and the first fixing portion 232*a* may be tapered toward the second fixing portion 232*b*.

In other words, according to the locking portion 232, the first fixing portion 232*a*, the balls 232*c*, and the second fixing portion 232*b* may be arranged sequentially in the insertion direction of the piston portion 231 in the aperture 221*a*, in which the first fixing portion 232*a* comes in contact with the locking step 221*b* and the second fixing portion 232*b* closes the aperture 221*a* of the cylinder portion when the movable guide 230 is moved away. In particular, since the first fixing portion 232*a* is tapered toward the second fixing portion 232*b*, the position of the movable guide 230 may be fixed by the balls 232*c* between the first fixing portion 232*a* and the second fixing portion 232*b*.

Particularly, when the movable guide 230 is moved away from the fixed guide 220, the balls 232*c* between the first fixing portion 232*a* and the second fixing portion 232*b* may be moved together with the second fixing portion 232*b* in contact with the second fixing portion 232*b*. When the movable guide 230 is moved away from the fixed guide 220 and a pulling force may be applied to the webbing 110, as described above, the movable guide 230 may be returned to the fixed guide 220 by the load applied to the movable guide 230. In this process, the balls 232c between the first fixed portion 232a and the second fixed portion 232b may be moved on the tapered surface of the first fixing portion 232a and fitted between the tapered surface of the first fixing portion 232a and the aperture 221a of the cylinder portion 221, whereby the piston portion 231 is forced into the cylinder portion 221. Accordingly, the movable guide 230 may be fixed at the position spaced apart from the fixed guide 220, so the pulling force of the webbing 110 may be maintained and the passenger may be held more stably against the seat.

Further, the cylinder portion 221 may include: an outer body 222 that extends from the fixed guide 220, having an insertion aperture 222a, and having a plurality of locking protrusions 222b circumferentially formed and longitudinally arranged in the insertion aperture 222a; and an inner body 223 inserted in the insertion hole 222a of the outer body 222, having the aperture 221a, in which the locking portion 232 of the piston portion 231 is inserted, and having locking grooves 223a formed on the outer side to correspond to the locking protrusions 222b.

This configuration provides the function of a load limiter to a pretensioner. Further, according to this configuration, as shown in FIG. 4, the cylinder portion 221 may include the outer body 222 and the inner body 223, and the outer body 222 and the inner body 223 may be locked to each other, but the inner body 223 may be moved in the outer body 222 when a predetermined load is applied, whereby the pulling force of the webbing 110 may be changed.

In particular, as shown in FIG. 4, the cylinder portion 221 may include the outer body 222 having the insertion aperture 222a and having locking protrusions 222b in the insertion aperture 222a and the inner body 223 inserted in the insertion aperture 222a of the outer body 222 and having the locking grooves 223a corresponding to the locking protrusions 222b. The locking portion 232 of the piston portion 231 may be inserted in the aperture 221a of the inner body 223 and may be moved in the inner body 223.

In other words, when the actuator 250 is operated, the locking portion 232 of the piston portion 231 inserted in the inner body 223 of the cylinder portion 221 may be moved by gas, and thus, the movable guide 230 may be moved away from the fixed guide 220. When the movable guide 230 is moved away from the fixed guide 220 and a pulling force is applied to the webbing 110, as described above, the movable guide 230 may be returned to the fixed guide 220 by the load applied to the movable guide 230. The movable guide 230 may be fixed at a predetermined position in the inner body 232 by the locking portion 232 including the first fixing portion 232a, the second fixing portion 232b, and the balls 232c, and load by the pulling force of the webbing 110 may be applied to the locking portion 232 and the inner body 223.

When the load applied to the inner body 223 increases over a predetermined level, the locking grooves 223a formed on the outer side of the inner body 223 slide down over the locking protrusions 222b formed in the insertion aperture 222a of the outer body 222, thereby providing a load meter function. As described above, when a vehicle collision is sensed, the movable guide 230 may be moved away from the fixed guide 220 and a pulling force may be applied to the webbing 110 and thus, a passenger may be held more stably. Further, when a predetermined level of load is applied to the webbing 110, the inner body 223 of the cylinder portion 221 may be inserted into the outer body 222 and a shock may be attenuated thus substantially reducing potential injury to the passenger.

As another exemplary embodiment of the load meter function, the movable guide 230 may be made of a material having lower rigidity, but greater toughness than the fixed guide to be bent by the pulling force of the webbing 110 when drawn out of the fixed guide 220. Accordingly, the fixed guide 220 may be made of a ceramic material or a steel material having large rigidity, hardness, and rupture strength, but small roughness and the movable guide 230 may be made of a stainless material having relatively small rigidity and hardness, but large roughness. Accordingly, when a vehicle collision is sensed, the movable guide 230 may be moved away from the fixed guide 220 and a pulling force may be applied to the webbing 110 to more stably hold a passenger against the seat. Further, when a predetermined level of load is applied to the webbing 110, the load meter function that attenuates shock by bending of the movable guide 230, as shown in FIG. 5, thus substantially reducing potential an injury to the passenger.

Meanwhile, as shown in FIG. 3, fixing protrusions 220b may be formed on the outer side of the fixed guide 220 and spaced apart from each other in the longitudinal direction of the fixed guide 220 and supporting protrusions 230b may be formed on the outer side of the movable guide 230 and spaced apart from each other in the longitudinal direction of the movable guide 230. The fixing protrusions 220b and the supporting protrusions 230b may each be spaced apart from each other in the longitudinal direction by the width of the webbing 110. The webbing 110 may extend diagonally and wind around the fixed guide 220 and the movable guide 230 without overlapping, and the fixing protrusions 220b and the supporting protrusion 230b may be spaced apart from each other such that the webbing 110 diagonally extending diagonally is wound around the fixed guide 220 and the movable guide 230.

Since the fixing protrusions 220b longitudinally spaced apart from each other may be formed on the fixed guide 220 and the supporting protrusions 230b longitudinally spaced apart from each other may be formed on the movable guide 230, as described above, the webbing 110 wound around the fixed guide 220 and the movable guide 230 may be fitted between the fixing protrusions 220b and between the supporting protrusions 230b, and thus, the webbing 110 may be fixed (e.g., unable to be moved) in the longitudinal direction of the fixed guide 220 and the movable guide 230. In particular, the fixing protrusions 220b and the supporting protrusions 230b may be spaced from each other in a zigzag pattern, and thus, the webbing 110 may be wound diagonally in a zigzag pattern around the fixed guide 220 and the movable guide 230 and may be maintained in the zigzag pattern.

According to the seat belt safety apparatus for a vehicle having the structure described above, the functions of a retractor and a pretensioner are both implemented in a structure in which a seat belt is disposed in a seat. Further, the functions of a retractor and a pretensioner are separated and thus the installation space may be reduced. Additionally, the functions may be performed more smoothly and thus, stability of a passenger may be secured.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A seat belt safety apparatus for a vehicle, the seat belt safety apparatus, comprising:
   a webbing wound into or drawn out of a retractor to hold a passenger in a seat; and
   a pretensioner spaced apart from the retractor and including a plurality of guides around which the webbing is wound and an actuator providing actuating force to the guides,
   wherein one of the plurality of guides is configured to move away from another of the plurality of guides to apply a holding force to the passenger by pulling the webbing when the actuator is operated and the guides are moved away from each other, and
   wherein the retractor and the pretensioner are installed on a seat frame, the retractor is disposed under the pretensioner, and the webbing extends upward diagonally with respect to the seat frame and is wound around the guides without overlapping.

2. The seat belt safety apparatus of claim 1, wherein the guides include:
   a fixed guide fixed to a vehicle body or a seat frame with the actuator mounted thereon; and
   a movable guide movably coupled to the fixed guide to be able to move away from the fixed guide by being drawn out of the fixed guide when the actuator is operated.

3. The seat belt safety apparatus of claim 2, wherein the movable guide is made of a material having lower rigidity and greater toughness than the fixed guide to be bent by a pulling force of the webbing when the movable guide is drawn out of the fixed guide.

4. The seat belt safety apparatus of claim 2, wherein the fixed guide and the movable guide are formed in bar shapes and arranged symmetrically, the fixed guide includes cylinder portions extending in a direction in which the movable guide moves away from the fixed guide, the cylinder portions each have an aperture being open in the extension direction, and the movable guide has piston portions extending to be inserted in the apertures of the cylinder portions.

5. The seat belt safety apparatus of claim 4, wherein the actuator is a gas supplier that is mounted on the fixed guide and operates to supply gas to the cylinder portions, and when gas is supplied, the piston portions are released from the cylinder portions and the movable guide is moved away from the fixed guide.

6. The seat belt safety apparatus of claim 4, wherein the fixed guide includes a central aperture therein, the cylinder portions are formed at both ends of the central aperture and communicate with the central aperture, and the piston portions of the movable guide are inserted in the cylinder portions.

7. The seat belt safety apparatus of claim 4, wherein a locking step is formed in each of the apertures of the cylinder portions and a locking portion is formed at each of the piston portions to be locked to a corresponding one of the locking steps while sliding in a corresponding one of the apertures.

8. The seat belt safety apparatus of claim 7, wherein the locking portion includes:
   a first fixing portion; and
   a second fixing portion spaced apart from the first fixing portion in an insertion direction of the piston portion in the aperture,
   wherein balls are disposed between the first fixing portion and the second fixing portion, and the first fixing portion is tapered toward the second fixing portion.

9. The seat belt safety apparatus of claim 8, wherein the cylinder portion includes:
   an outer body extending from the fixed guide, having an insertion aperture, and a plurality of locking protrusions circumferentially formed and longitudinally arranged in the insertion aperture; and
   an inner body inserted in the insertion aperture of the outer body, having the aperture, in which the locking portion of the piston portion is inserted, and locking grooves formed on the outer side to correspond to the locking protrusions.

10. The seat belt safety apparatus of claim 2, wherein fixing protrusions are formed on the outer side of the fixed guide and spaced apart from each other in the longitudinal direction of the fixed guide, supporting protrusions are formed on the outer side of the movable guide and spaced apart from each other in the longitudinal direction of the movable guide, and the fixing protrusions and the supporting protrusions are each spaced apart from each other in the longitudinal direction by the width of the webbing.

11. The seat belt safety apparatus of claim 10, wherein the fixing protrusions of the fixed guide and the supporting protrusions of the movable guide are spaced apart from each other in a zigzag pattern to diagonally wind the webbing to the facing direction of the fixing protrusions and the supporting protrusions.

* * * * *